June 26, 1923.  R. LEISER ET AL  1,459,777
PROCESS AND APPARATUS FOR THE CHLORINATION OF METHANE (C H4)
Filed Feb. 14, 1920
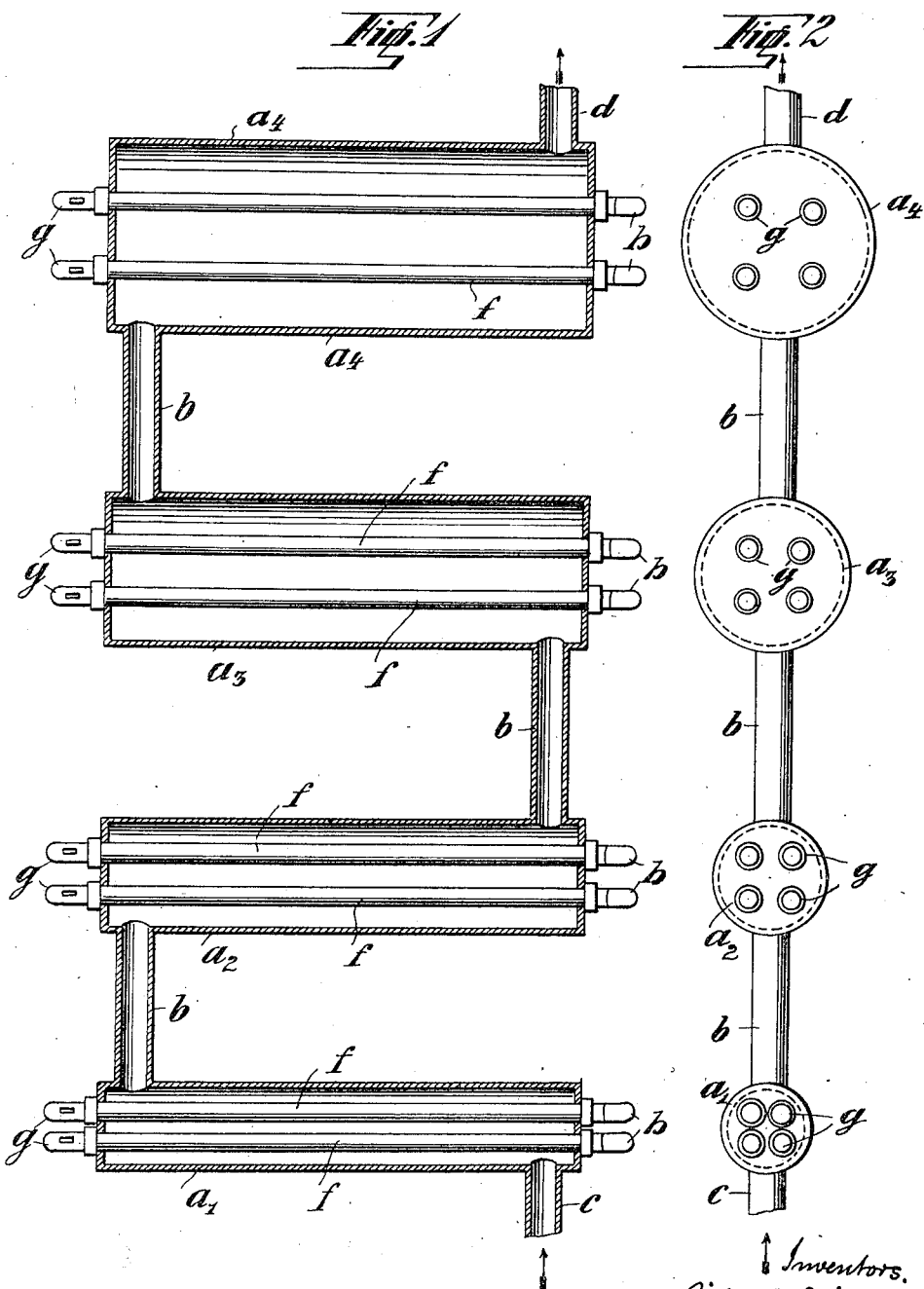

Patented June 26, 1923.

1,459,777

UNITED STATES PATENT OFFICE.

RICHARD LEISER AND FRITZ ZIFFER, OF VIENNA, AUSTRIA.

PROCESS AND APPARATUS FOR THE CHLORINATION OF METHANE ($CH_4$).

Application filed February 14, 1920. Serial No. 358,716.

*To all whom it may concern:*

Be it known that we, RICHARD LEISER and FRITZ ZIFFER, citizens of the Republic of Austria, residing at Vienna, Austria, have invented certain new and useful Improvements in Processes and Apparatus for the Chlorination of Methane ($CH_4$), of which the following is a specification.

This invention relates to a new and improved process and apparatus for the chlorination of methane, the main ingredient of natural gas and light carburetted hydrogen.

The chlorination of methane by direct treatment with chlorine gas is obtained in two different ways. One part of the processes known utilizes high temperatures for this reaction, another part uses for the activation of the process of chlorination chemically active light of natural or artificial source. The present invention relates to the category of the processes using active light. The principal aim of the process is to conduct the reaction in such a way that the final product consists in general of methyl chloride ($CH_3Cl$), so that the formation of the higher chlorids of carbon is avoided as much as possible. This is obtained by exposing to the influence of chemically active light without heating, a mixture of methane and chlorine containing a great excess of methane. For light-source is advantageously used quicksilver vapour light (the light of the quicksilver arc-lamp).

In practicing the process a mixture of about one volume of chlorine and six volumes of methane, that is conveniently dosed and regulated by means of chlorine-proof current-manometers (rotameters), is conducted in rapid current through appropriate chambers of reaction. The best results are obtained when refrigeration is used in this process. There is obtained in this way a product of reaction containing chiefly methyl chloride. When the refrigeration and the rapidity of the current are conveniently regulated, the proportion of the gases mixed together may be changed within certain limits without the risk of the chlorination taking an inconvenient course.

It has further proved useful to add aqueous vapour to the gas-mixture, by which the separation of carbon, that has otherwise a disturbing effect upon the process in the chamber of reaction, is completely suppressed. The aqueous vapour is added only in so small quantities that it may become effective as negative catalyzer for avoiding the undesirable reaction $CH_4+2Cl_2=C+4HCl$.

It has further proved advantageous to add to the gas-mixture gaseous substances acting as light-catalyzators such as traces of gaseous halogens, as well as some hydrochloric acid gas, in order to obtain in this way from the beginning a certain concentration of chlorohydric acid, by which the formation of highly chlorinated products that would otherwise form is reduced and the percentage of methyl chloride consequently increased.

In spite of the excess of methane to be used, the reaction may be interrupted if there is still chlorine.

From the gaseous product of reaction are separated in the usual way the hydrochloric acid added as well as that formed during the reaction, and the added aqueous vapour. The chloride of methyl is then separated from the purified gas-mixture by fractional refrigeration or by absorption or compression or by simultaneous use of several or all of these means. It is convenient, in this case, to hold the temperature of refrigeration a little above the freeizng-point of the methyl chloride.

For chamber for the gaseous reaction there is used an oblong recipient with mercury arc-lamps disposed therein; with advantage quartz-glass lamps are used. For the construction or for the lining of the chamber of reaction are chosen acid and chlorine-proof materials reflecting well the active rays. The fact that, for the chlorination in presence of chemically active light, the capacity of reflecting of the chlorine- and acid-proof materials has a certain importance, has remained unnoticed till now. When this fact is taken into consideration, it leads e. g. to the adoption of milk-glass for the above-mentioned purpose.

The diameter of the chamber of reaction is determined, according to the invention, by the sphere of efficiency of the active rays in the mixture of gases used in each special case. As the sphere of efficiency increases with the decreasing of the percentage of chlorine of the current of gases, it is convenient to make the diameter of the chamber of reaction or of the chambers of reaction connected in series progressively larger in the direction of the current of gas.

The drawing shows a schematic view of an application of the new device, Fig. 1 showing this device in longitudinal section, Fig. 2 in view.

The device consists of a certain number for instance of four cylindrical chambers of reaction $a^1$, $a^2$, $a^3$, $a^4$, connected with each other by means of the tubes $b$. The gases to be brought into reaction enter at $c$, and leave at $d$. The diameter of each of the chambers $a_2$, $a_3$, $a_4$ is larger than that of the chamber preceding in the direction of the current of gas.

In each of the chambers $a_1$, $a_2$, $a_3$, $a_4$ are disposed several, for instance four, mercury arc-lamps $f$, the contacts of which are designated with the letters $g$ and $h$.

A mixture consisting of six volumes of methane and one volume of chlorin, after passing a refining device charged with hydro-chloric acid and entering at C is carried rapidly through reaction chambers illuminated by mercury lamps $f$ and without admission of heat. The gases drawn out at $d$ then pass through three towers charged with washing solutions; thereupon through two receivers, in the first of which are condensed the greater portion of the dried reaction products which have been delivered of hydrochloric acid and pure chlorin, in the second receiver the remainder of the generated chlormethyl, etc., are deposited in solid form. 600 liter methane and 100 liter chlorin, will in this manner give 160 gram chlormethyl together with 30 gram products of higher chlorin content.

While we have made use of the term "methane" as descriptive of the starting product of reaction as carried on by the improved process and in the improved apparatus, we wish it understood that we have used such term by way of illustration, and not in any sense by way of limitation since the improved process and apparatus are designed and intended for the chlorination of all gases containing methane as the main ingredient, as natural gas and light carburetted hydrogen.

We claim:

1. In the process of manufacturing methyl-chlorid from methane and chlorin gas, exposing a mixture of methane containing gas with chlorin gas in the presence of an excess of methane in the proportion of one volume of chlorin to about six volumes of methane to the action of actinic light without starting the reaction by external heating.

2. The process of manufacturing methyl-chlorid from methane and chlorin, consisting in adding to a mixture of one volume of chlorin to about six volumes of methane hydrochloric acid gas, exposing the said mixture in a rapid current to the action of actinic light without starting the reaction by external heating, interrupting the reaction if chlorin should remain, and separating the methyl-chlorid from the unused methane by cooling the obtained reaction gases, finally delivered from the hydrochloric acid gas.

In testimony whereof we affix our signatures.

RICHARD LEISER.
FRITZ ZIFFER.